(12) United States Patent
Zhang et al.

(10) Patent No.: US 8,116,038 B1
(45) Date of Patent: Feb. 14, 2012

(54) DEPOPULATED DISK DRIVE HEAD STACK ASSEMBLY HAVING A NECKED DUMMY MASS WITH RELIEF ALCOVES

(75) Inventors: Qing Zhang, Fremont, CA (US); Hongqi Li, Redwood City, CA (US); David K. Myers, Campbell, CA (US); Enoch Mylabathula, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 106 days.

(21) Appl. No.: 12/779,225

(22) Filed: May 13, 2010

(51) Int. Cl.
*G11B 21/16* (2006.01)
(52) U.S. Cl. .................................................. 360/244.5
(58) Field of Classification Search ................ 360/244.5
See application file for complete search history.

(56) References Cited

U.S. PATENT DOCUMENTS

| | | | |
|---|---|---|---|
| 4,346,416 A | 8/1982 | Riggle et al. | |
| 5,296,984 A * | 3/1994 | Fick | 360/244.5 |
| 5,854,721 A | 12/1998 | Lim | |
| 5,946,164 A * | 8/1999 | Tracy | 360/244.5 |
| 6,166,886 A * | 12/2000 | Toensing | 360/244.5 |
| 6,349,464 B1 | 2/2002 | Codilian et al. | |
| 6,388,841 B1 * | 5/2002 | Summers | 360/244.5 |
| 6,502,300 B1 | 1/2003 | Casey et al. | |
| 6,532,137 B2 | 3/2003 | Huang et al. | |
| 6,538,853 B1 | 3/2003 | Williams et al. | |
| 6,661,615 B2 | 12/2003 | Tsuda | |
| 6,757,136 B2 * | 6/2004 | Buske et al. | 360/244.5 |
| 6,775,106 B1 | 8/2004 | Williams et al. | |
| 7,016,157 B1 | 3/2006 | Williams et al. | |
| 7,124,496 B2 * | 10/2006 | Kashima et al. | 29/603.06 |
| 7,417,830 B1 * | 8/2008 | Kulangara | 360/294.4 |
| 7,595,961 B2 * | 9/2009 | Shimozato | 360/244.6 |
| 7,952,835 B2 * | 5/2011 | Lee et al. | 360/244.5 |
| 2003/0218833 A1 | 11/2003 | Nagahiro et al. | |

OTHER PUBLICATIONS

U.S. Appl. No. 12/190,326, filed Aug. 12, 2008, 14 pages.

* cited by examiner

*Primary Examiner* — Mark Blouin

(57) ABSTRACT

A novel disk drive head stack assembly (HSA) includes a first head gimbal assembly attached to a first actuator arm. A dummy mass is attached to a second actuator arm. The dummy mass includes a mounting plate portion defining a mounting plate width. The mounting plate portion includes first and second projections. The dummy mass also includes a neck portion defining a neck width and a neck length. A root portion of the neck portion is disposed between the first and second projections, and defines first and second alcoves between the root portion and the first and second projections, respectively. The dummy mass also includes a distal mass portion defining a distal mass width and a distal mass length. The neck width is less than the mounting plate width, and the neck width is less than the distal mass width.

18 Claims, 3 Drawing Sheets

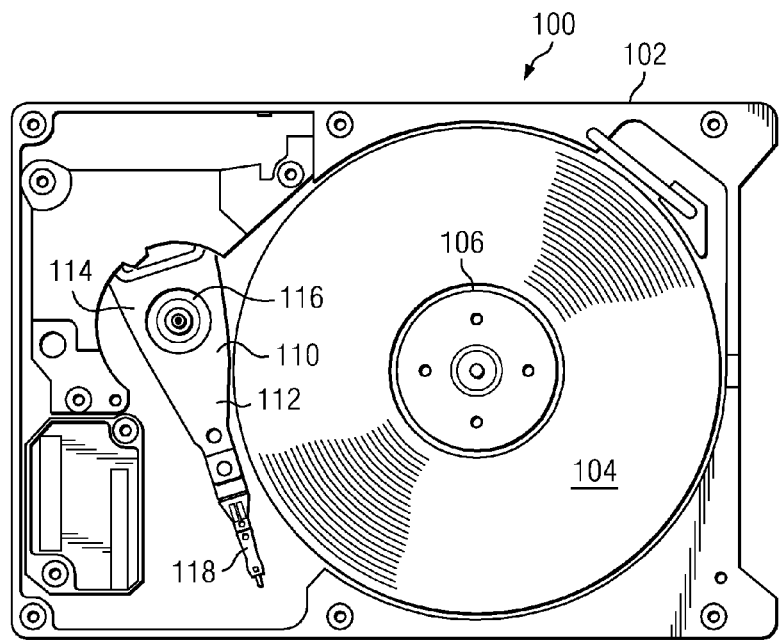
FIG. 1
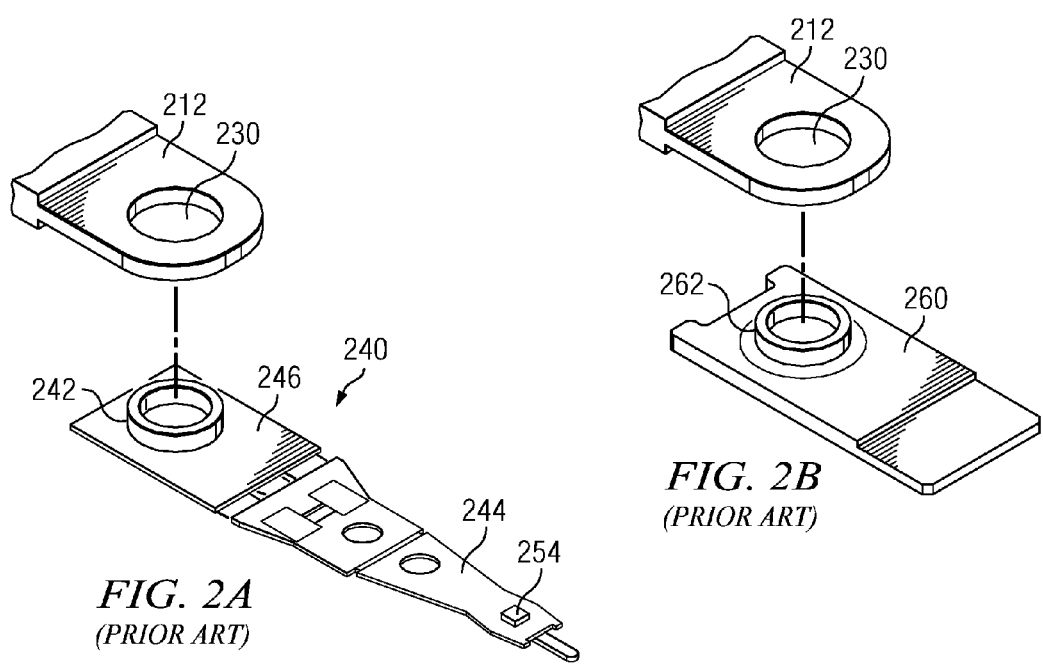
FIG. 2A
*(PRIOR ART)*
FIG. 2B
*(PRIOR ART)*

DEPOPULATED DISK DRIVE HEAD STACK ASSEMBLY HAVING A NECKED DUMMY MASS WITH RELIEF ALCOVES

BACKGROUND

The typical hard disk drive includes a head disk assembly (HDA) and a printed circuit board (PCB) attached to a disk drive base of the HDA. The head disk assembly includes at least one disk (such as a magnetic disk, magneto-optical disk, or optical disk), a spindle motor for rotating the disk, and a head stack assembly (HSA). The printed circuit board assembly includes electronics and firmware for controlling the rotation of the spindle motor and for controlling the position of the HSA, and for providing a data transfer channel between the disk drive and its host. The HSA typically includes an actuator, at least one head gimbal assembly (HGA), and a flex cable assembly. During operation of the disk drive, the actuator must rotate to position the HGAs adjacent desired information tracks on the disk.

Each HGA includes a head for reading and writing data from and to the disk. In magnetic recording applications, the head typically includes an air bearing slider and a magnetic transducer that comprises a writer and a read element. The magnetic transducer's writer may be of a longitudinal or perpendicular design, and the read element of the magnetic transducer may be inductive or magnetoresistive. In optical and magneto-optical recording applications, the head may include a minor and an objective lens for focusing laser light on to an adjacent disk surface. The head is adhered to a suspension assembly that includes a gimbal, load beam, bend region, and swage plate. The suspension acts to preload the head against the surface of the disk. The preload force is often referred to as the "gram load." Each HGA is attached to the distal end of one of the actuator arms, typically by an attachment process known as "swaging" that involves forcing a slightly oversized ball through a boss in the swage plate to cause the boss to plastically expand within a hole in a corresponding actuator arm.

Generally, the greatest data capacity for a given disk drive design is obtained when there is at least one HGA corresponding to each disk surface, so that there are two HGAs swaged to each actuator arm between disks, and one HGA swaged on each of the uppermost and lowermost actuator arms. This condition is referred to in the art as a "fully populated" disk drive. For example, if a disk drive has a spindle hub that is designed to accommodate three disks, then its actuator would most likely be designed to have four arms (an uppermost arm, two "middle arms" between disks, and a lowermost arm), and such a disk drive would be considered "fully populated" if it included three disks and six HGAs (two swaged to each of the middle arms and one swaged to each of the uppermost and lowermost arms).

Yet not all disk drive customers require or want to pay for the greatest data capacity that a given disk drive design can provide, and the HGA and disk components are among the most expensive components in the disk drive. Therefore, it is commercially advantageous to the disk drive manufacturer to offer so-called "depopulated" versions of a disk drive design, in which one or more HGAs and/or disks are intentionally absent. For example, with reference to the previously described disk drive design that can accommodate three disks and six HGAs, one of the disks and two of the HGAs might be intentionally left out of the assembly to create a less expensive disk drive with $\frac{2}{3}^{rds}$ the data capacity of the fully-populated version.

A special clamp or disk spacers of a different thickness might be necessary to compensate for the absence of the omitted disk on the spindle hub. Nevertheless, the total cost of engineering development of a family of depopulated disk drives (all based on a single disk drive design for the highest data capacity target) is far lower than would be the cost of independent engineering development of a different design for each of the lower data capacities that might be achieved by depopulation. Therefore, depopulating disk drives is typically the most efficient and practical way for disk drive manufacturers to competitively meet a broad spectrum of customer requirements related to price and data capacity. Accordingly, depopulation may significantly increase disk drive sales without prohibitively increasing engineering development costs.

However, the absence of one or more HGAs on a subset of actuator arms can change the center of gravity of the HSA relative to where the center of gravity would be if the HSA were fully populated. To alleviate this problem, simple dummy masses have been swaged to the actuator arms as a substitute for each absent HGA in depopulated HSAs. Still, even with the dummy masses the dynamic characteristics of the depopulated HSA may be sufficiently different to affect dynamic control, which in turn may lead to reduced system bandwidth and impaired data track seeking and data track following functionality, possibly even increasing data access times and/or error rates when reading and writing data.

Accordingly, there is a need in the art for improved dummy masses for use in depopulated HSAs.

BRIEF DESCRIPTION OF THE DRAWINGS

FIG. 1 depicts a head disk assembly (HDA) of a disk drive that is capable of incorporating an embodiment of the present invention.

FIG. 2A depicts a conventional head gimbal assembly (HGA) with its swaging boss aligned with an actuator arm swaging hole.

FIG. 2B depicts a conventional dummy mass with its swaging boss aligned with an actuator arm swaging hole.

DETAILED DESCRIPTION

Figure 2C:
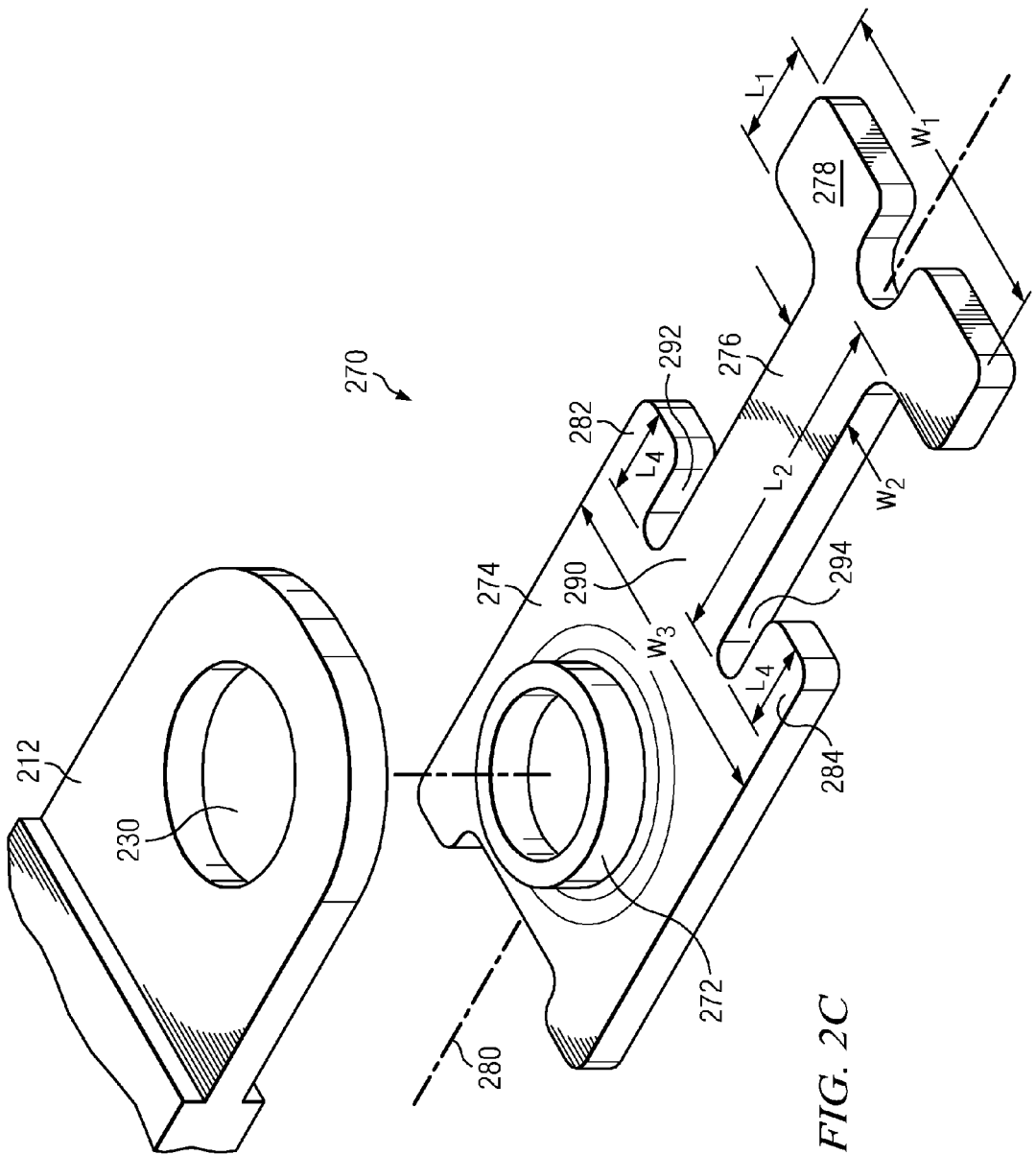
FIG. 2C depicts a dummy mass according to an embodiment of the present invention, with its swaging boss aligned with an actuator arm swaging hole.

FIG. 1 depicts a head disk assembly (HDA) 100 of a disk drive that is capable of incorporating an embodiment of the present invention. HDA 100 includes a disk drive base 102. At least one disk 104 is rotably mounted to the disk drive base 102 via spindle motor 106. A head stack assembly (HSA) 110 is rotably mounted to the disk drive base 102 via an actuator pivot 116. The HSA 110 includes an actuator body 114 from which a plurality of arms 112 extend. At least one HGA 118 is mounted to the distal end of at least one of the actuator arms 112. The opposite end of each of the plurality of actuator arms 112 is a supported end adjoining the actuator body 114. In certain embodiments, the actuator body 114 may be fabricated of a metal material such as aluminum, stainless steel, magnesium, beryllium, or an alloy thereof, by casting, extrusion, and/or forging.

FIG. 2A depicts a conventional head gimbal assembly (HGA) 240 and a distal region of an actuator arm 212 that includes a swaging hole 230. The conventional HGA 240 includes a load beam 244, a head 254, and a swage mount 246 having a raised annular swaging boss 242 adapted to fit within the swaging hole 230. The head 254 includes a conventional transducer for reading and/or writing data from/to a surface of a recording media (e.g. disk 104). For example, in magnetic recording hard disk drive applications, the read transducer may be a magneto resistive sensor, and the write transducer may be a longitudinal or perpendicular magnetic writer. In optical recording applications, the head may include an objective lens for focusing laser light upon the recording media surface.

In FIG. 2A, the raised annular boss 242 is shown to be aligned with the swaging hole 230 prior to insertion. Swaging is an attachment process that depends upon plastic deformation of the annular boss 242. First the annular boss 242 is inserted into the swaging hole 230 in the distal portion of corresponding actuator arm 212, and then a slightly oversized interfering ball (not shown) is forced through the annular boss 242 causing it to plastically expand within the swaging hole 230. The plastic expansion of the annular boss 242 causes a permanent radial interference between the annular boss 242 and the swaging hole 230, thereby attaching the swaging plate 246 of the suspension assembly to the actuator arm 212.

FIG. 2B depicts a conventional dummy mass 260 with its swaging boss 262 aligned with the swaging hole 230 of the distal region of an actuator arm 212. Contemporary dummy mass 260 is rectangular in shape. Other contemporary dummy masses have been circular in shape.

FIG. 2C depicts a dummy mass 270 according to an embodiment of the present invention, with its swaging boss 272 aligned with the swaging hole 230 of the distal region of an actuator arm 212. Hence, the dummy mass 270 may be attached to the actuator arm 212 via a swage connection. The dummy mass 270 defines a longitudinal axis 280 and includes a mounting plate portion 274 that defines a mounting plate width $W_3$. The mounting plate width $W_3$ is preferably but not necessarily in the range 2 mm to 5.5 mm.

In the embodiment of FIG. 2C, the mounting plate portion 274 includes first and second projections 282, 284, respectively. The dummy mass 270 also includes a neck portion 276 defining a neck width $W_2$ and a neck length $L_2$. A root portion 290 of the neck portion 276 is disposed between the first and second projections 282, 284, so as to define first and second alcoves 292, 294 between the root portion 290 and the first and second projections, 282, 284 respectively.

In the embodiment of FIG. 2C, the dummy mass 270 also includes a distal mass portion 278 defining a distal mass width $W_1$ and a distal mass length $L_1$. Note that the dummy mass 270 does not include any read/write head, which is why the dummy mass is significantly cheaper than an HGA and why the dummy mass 270 qualifies as a "dummy mass" as distinguished from an HGA. Note also that, in the present context, length dimensions are measured parallel to the longitudinal axis and width dimensions are measured normal to the longitudinal axis. The dummy mass 270 may be fabricated of stainless steel. In this case, the dummy mass 270 may define a dummy mass thickness that is preferably but not necessarily in the range 0.1 mm to 0.5 mm.

In the embodiment of FIG. 2C, the neck portion 276 is narrower than the mounting plate portion 274 and the neck portion 276 is narrower than the distal mass portion 278. That is, $W_2<W_3$, and $W_2<W_1$. Also, in the embodiment of FIG. 2C, the neck length $L_2$ is preferably in the range ⅓ to 2 times the mounting plate width $W_3$, and the neck width $W_2$ is preferably in the range 1/10 to ⅗ the mounting plate width $W_3$. Also, the distal mass length $L_1$ is preferably in the range 1/10 to 1 times the mounting plate width $W_3$ and the distal mass width $W_1$ is preferably in the range ⅘ to 1.5 times the mounting plate width $W_3$. Also, the first and second projections 282, 284 each defines a projection length $L_4$ in the range 1/10 to 1 times the mounting plate width $W_3$. The foregoing ranges and dimensional inequalities, together with influence on the neck length $L_2$ of the neck portion 276 by the alcoves 292, 294, may serve to tune the vibration of the dummy mass 270, especially in the lateral, torsional, and sway modes of vibration. That is, these ranges and dimensional inequalities may give the dummy mass 270 dynamic characteristics that may cause the frequency response function of the depopulated HSA to more closely mimic the frequency response function of the fully populated HSA.

Figure 3A:
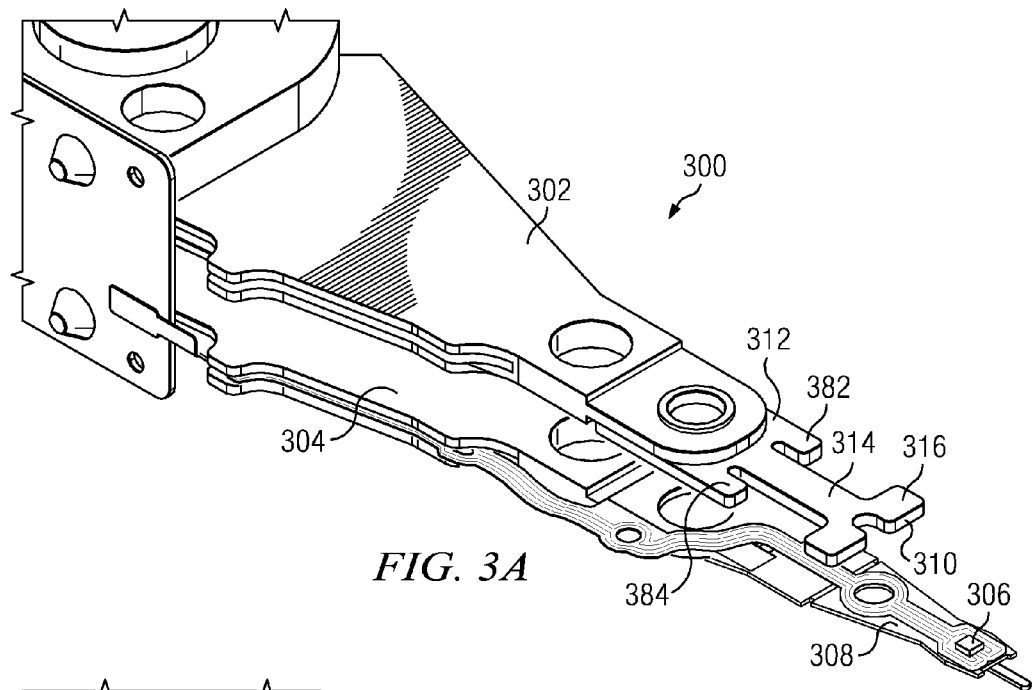
FIG. 3A depicts a depopulated HSA according to an embodiment of the present invention.

FIG. 3A depicts a depopulated HSA 300 according to an embodiment of the present invention. Depopulated HSA 300 is suitable for a disk drive design that can accommodate only a single disk, and the use of depopulated HSA 300 gives the disk drive approximately half of the data storage capacity than it would have with a fully populated HSA. HSA 300 includes a first actuator arm 304 and a second actuator arm 302. A first head gimbal assembly 308 is attached to the first actuator arm 304. The first head gimbal assembly 308 includes a read head 306. A dummy mass 310 is attached to the second actuator arm 302. The dummy mass 310 includes a mounting plate portion 312 with first and second projections 382, 384, a neck portion 314, and a distal mass portion 316.

Figure 3B:
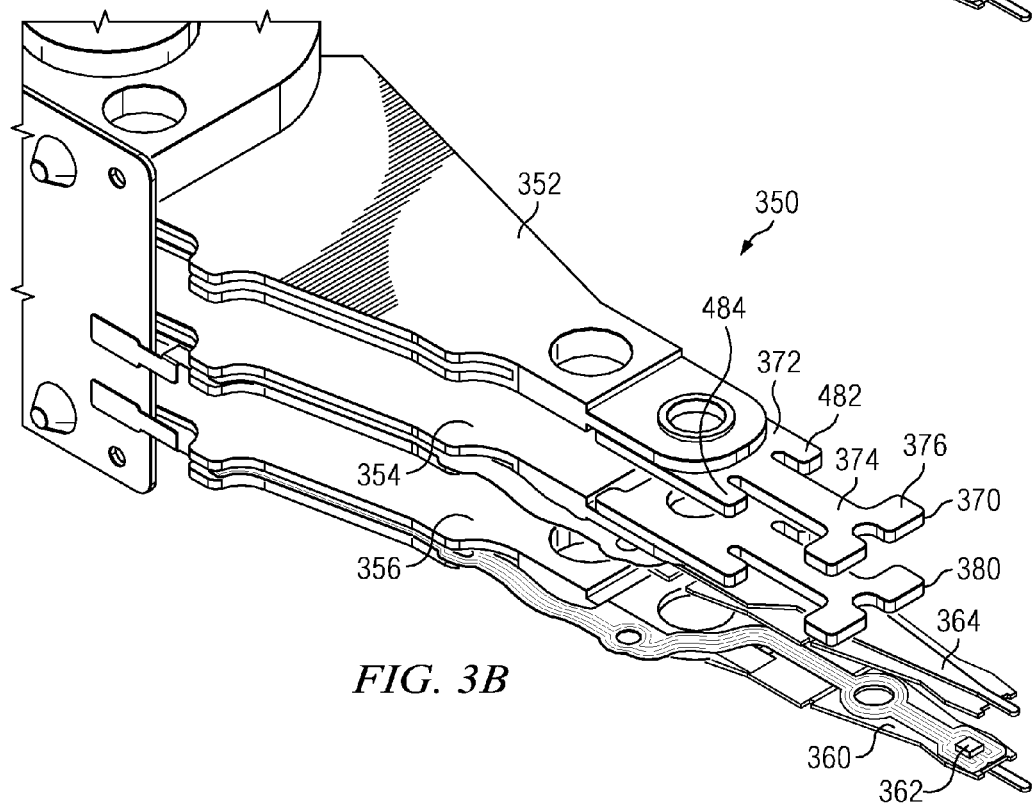
FIG. 3B depicts a depopulated HSA according to another embodiment of the present invention.

FIG. 3B depicts a depopulated HSA 350 according to another embodiment of the present invention. Depopulated HSA 350 is suitable for a disk design that can accommodate two disks, but depopulated HSA 350 has been configured for a depopulated disk drive in which the upper one of the two disks is intentionally absent. Specifically, HSA 350 includes a lowermost first actuator arm 356, a middle actuator arm 354, and an uppermost second actuator arm 352. A first head gimbal assembly 360 is attached to the first actuator arm 356. The first head gimbal assembly 360 includes a read head 362. A second head gimbal assembly 364 is attached to the middle actuator arm 354.

In the embodiment of FIG. 3B, a first dummy mass 370 is attached to the second actuator arm 352. The first dummy mass 370 includes a mounting plate portion 372 with first and second projections 482, 484, a neck portion 374, and a distal mass portion 376. Also in the embodiment of FIG. 3B, a second dummy mass 380 is attached to the middle actuator arm 354. Accordingly, the use of depopulated HSA 350, along with the intentional omission of the upper of two disks, would give a corresponding disk drive approximately 50% of the data storage capacity that it would have with a fully populated HSA and with both disks present. Of course, depending on the number of HGAs replaced by dummy masses in the embodiment of FIG. 3B, other data storage capacities are also practically obtainable (e.g. 25% data storage capacity if HGA 364 or 360 were also replaced by a dummy mass, or 75% data storage capacity if another HGA were included instead of either dummy mass 370 or 380 (and both disks were included in the disk drive).

In the foregoing specification, the invention is described with reference to specific exemplary embodiments thereof, but those skilled in the art will recognize that the invention is not limited thereto. It is contemplated that various features and aspects of the above-described invention may be used individually or jointly and possibly in an environment or application beyond those described herein. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. The terms "comprising," "including," and "having," as used herein are intended as open-ended terms.

We claim:

1. A disk drive comprising:
   a disk drive base;
   a spindle rotably coupled to the disk drive base, and a disk attached to the spindle; and
   a head stack assembly (HSA) including
      first and second actuator arms;
      a first head gimbal assembly attached to the first actuator arm, the first head gimbal assembly including a read head;
      a dummy mass attached to the second actuator arm, the dummy mass including
         a mounting plate portion defining a mounting plate width, the mounting plate portion including first and second projections;
         a neck portion defining a neck width and a neck length, a root portion of the neck portion disposed between the first and second projections and defining first and second alcoves between the root portion and the first and second projections, respectively;
         a distal mass portion defining a distal mass width and a distal mass length;
         wherein the neck width is less than the mounting plate width and the neck width is less than the distal mass width.

2. The disk drive of claim 1 wherein the mounting plate width is in the range 2 mm to 5.5 mm.

3. The disk drive of claim 1 wherein the dummy mass is attached to the second actuator arm via a swage connection.

4. The disk drive of claim 1 wherein the neck length is in the range $1/3$ to 2 times the mounting plate width.

5. The disk drive of claim 1 wherein neck width is in the range $1/10$ to $3/5$ the mounting plate width.

6. The disk drive of claim 1 wherein the distal mass length is in the range $1/10$ to 1 times the mounting plate width.

7. The disk drive of claim 1 wherein distal mass width is in the range $4/5$ to 1.5 times the mounting plate width.

8. The disk drive of claim 1 wherein the dummy mass comprises stainless steel and defines a dummy mass thickness in the range 0.1 mm to 0.5 mm.

9. The disk drive of claim 1 wherein the first and second projections each defines a projection length in the range $1/10$ to 1 times the mounting plate width.

10. A head stack assembly (HSA) comprising:
    first and second actuator arms;
    a first head gimbal assembly attached to the first actuator arm, the first head gimbal assembly including a read head;
    a dummy mass attached to the second actuator arm, the dummy mass including
       a mounting plate portion defining a mounting plate width, the mounting plate portion including first and second projections;
       a neck portion defining a neck width and a neck length, a root portion of the neck portion disposed between the first and second projections and defining first and second alcoves between the root portion and the first and second projections, respectively;
       a distal mass portion defining a distal mass width and a distal mass length;
       wherein the neck width is less than the mounting plate width and the neck width is less than the distal mass width.

11. The HSA of claim 10 wherein the mounting plate width is in the range 2 mm to 5.5 mm.

12. The HSA of claim 10 wherein the dummy mass is attached to the second actuator arm via a swage connection.

13. The HSA of claim 10 wherein the neck length is in the range $1/3$ to 2 times the mounting plate width.

14. The HSA of claim 10 wherein neck width is in the range $1/10$ to $3/5$ the mounting plate width.

15. The HSA of claim 10 wherein the distal mass length is in the range $1/10$ to 1 times the mounting plate width.

16. The HSA of claim 10 wherein distal mass width is in the range $4/5$ to 1.5 times the mounting plate width.

17. The HSA of claim 1 wherein the dummy mass comprises stainless steel and defines a dummy mass thickness in the range 0.1 mm to 0.5 mm.

18. The HSA of claim 1 wherein the first and second projections each defines a projection length in the range $1/10$ to 1 times the mounting plate width.

* * * * *